United States Patent
Choi et al.

(10) Patent No.: US 9,917,895 B2
(45) Date of Patent: Mar. 13, 2018

(54) INFORMATION PROVIDING SYSTEM AND METHOD THEREOF

(71) Applicant: LG ELECTRONICS INC., Seoul (KR)

(72) Inventors: Sungha Choi, Seoul (KR); Kgiwung Ryoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 14/712,944

(22) Filed: May 15, 2015

(65) Prior Publication Data

US 2015/0341436 A1 Nov. 26, 2015

(30) Foreign Application Priority Data

May 22, 2014 (KR) .......................... 10-2014-0061717

(51) Int. Cl.
*G06F 15/16* (2006.01)
*H04L 29/08* (2006.01)
*H04L 29/06* (2006.01)
*H04W 4/04* (2009.01)

(52) U.S. Cl.
CPC .......... *H04L 67/1095* (2013.01); *H04L 67/02* (2013.01); *H04L 67/42* (2013.01); *H04W 4/046* (2013.01)

(58) Field of Classification Search
CPC ...... H04L 67/1095; H04L 67/02; H04L 67/42
USPC ....................................................... 709/203
See application file for complete search history.

(56) References Cited

U.S. PATENT DOCUMENTS

| 2012/0324482 | A1 | 12/2012 | Park | |
|---|---|---|---|---|
| 2013/0067086 | A1* | 3/2013 | Hershko | H04L 61/157 709/225 |
| 2013/0157647 | A1* | 6/2013 | Kolodziej | H04M 1/72522 455/419 |
| 2013/0303143 | A1* | 11/2013 | Schrader | H04W 12/08 455/418 |
| 2014/0213238 | A1* | 7/2014 | Giraud | G07C 5/008 455/418 |

(Continued)

FOREIGN PATENT DOCUMENTS

| CN | 103125079 A | 5/2013 |
|---|---|---|
| CN | 103503419 A | 1/2014 |

(Continued)

*Primary Examiner* — Karina J Garcia-Ching
(74) *Attorney, Agent, or Firm* — Birch, Stewart, Kolasch & Birch, LLP

(57) ABSTRACT

This specification allows a plurality of terminals to exchange and use data stored in each of the terminals through their own embedded web servers. An information providing system according to embodiments disclosed herein includes a first web server and a first controller both embedded in a telematics terminal mounted in a vehicle, and a second web server and a second controller both embedded in a mobile terminal. The first controller requests the second web server to transmit a first data corresponding to a first user request, receives the first data from the second web server, and executes the received first data. The second controller requests the first web server to transmit a second data corresponding to a second user request, receives the second data from the first web server, and executes the received second data.

12 Claims, 11 Drawing Sheets

(56) References Cited

U.S. PATENT DOCUMENTS

2016/0135237 A1* 5/2016 Gong .................. H04L 67/104
                                                                       370/329

FOREIGN PATENT DOCUMENTS

| CN | 103814546 A | 5/2014 |
|----|----|----|
| DE | 102012020974 A1 | 4/2014 |
| JP | 2011-186769 A | 9/2011 |
| KR | 10-2009-0078599 A | 7/2009 |
| KR | 10-2010-0062699 A | 6/2010 |
| KR | 10-2013-0024507 A | 3/2013 |

* cited by examiner

INFORMATION PROVIDING SYSTEM AND METHOD THEREOF

CROSS-REFERENCE TO RELATED APPLICATION

Pursuant to 35 U.S.C. § 119(a), this application claims the benefit of earlier filing date and right of priority to Korean Application No. 10-2014-0061717, filed on May 22, 2014, the contents of which is incorporated by reference herein in its entirety.

BACKGROUND OF THE DISCLOSURE

Field of the Disclosure

This specification relates to an information providing system and a method thereof.

Background of the Disclosure

In general, an information providing apparatus according to the related art is applicable to various devices such as mobile terminals, notebook computers, television sets and the like, and provides users with various types of information such as television broadcasting programs, audio information and the like.

SUMMARY OF THE DISCLOSURE

To achieve these and other advantages and in accordance with the purpose of this specification, as embodied and broadly described herein, there is provided an information providing system including a first web server and a first controller both embedded in a telematics terminal mounted in a vehicle, and a second web server and a second controller both embedded in a mobile terminal. Here, the first controller may request the second web server to transmit a first data corresponding to a first user request, receive the first data from the second web server, and execute the received first data, and the second controller may request the first web server to transmit a second data corresponding to a second user request, receive the second data from the first web server, and execute the received second data, wherein each of the first and second data include resource or application program.

In accordance with one exemplary embodiment disclosed herein, the first and second controllers may share the first and second data with each other through a vehicle communication network.

In accordance with one exemplary embodiment disclosed herein, the first controller may include a first web framework module that is configured to control the second web server to provide the first data stored in the second web server to the first controller, and the second controller may include a second web framework module that is configured to control the first web server to provide the second data stored in the first web server to the second controller.

In accordance with one exemplary embodiment disclosed herein, the first controller may further include a first data management module that is configured to manage the first data received from the second web server, and the second controller may further include a second data management module that is configured to manage the second data received from the first web server.

In accordance with one exemplary embodiment disclosed herein, the first data management module may stop the execution of the first data when the first data is a target to be regulated during movement of the vehicle and the vehicle is under movement.

In accordance with one exemplary embodiment disclosed herein, the second data management module may include metadata into the first data. Here, the metadata may indicate whether or not the first data is a target to be regulated during movement of the vehicle.

In accordance with one exemplary embodiment disclosed herein, the first and second controllers may share resources with each other through a vehicle communication network.

In accordance with one exemplary embodiment disclosed herein, the first controller may request the second controller to transmit an data list executable in the vehicle, receive from the second controller both the data list including data icons and stored position information related to respective data corresponding to the data icons, and display the received data list on a display unit of the telematics terminal. Here, the first controller may receive a specific data corresponding to a specific data icon from the second web server or a contents provider based on stored position information related to the specific data, when the specific data icon is selected from the displayed data list.

In accordance with one exemplary embodiment disclosed herein, the first controller may request the second controller to transmit an data list including data icons, receive the data list from the second controller, detect only data icons, which are not present in an data list stored in the telematics terminal, from the data icons included in the received data list, and display the detected data icons on the display unit of the telemetric terminal.

In accordance with one exemplary embodiment disclosed herein, wherein the first controller may request for an internet connection from an HTTP proxy server of the second web server, and the HTTP proxy server may access an external web server in response to the internet connection request, so as to receive contents from the external web server and provide the received contents to the first controller.

In accordance with one exemplary embodiment disclosed herein, the first controller may access an external web server, so as to receive contents from the external web server and display the received contents on a display unit of the telematics terminal.

To achieve these and other advantages and in accordance with the purpose of this specification, as embodied and broadly described herein, there is provided an information providing method in a system provided with a first web server and a first controller embedded in a telematics terminal mounted in a vehicle, and a second web server and a second controller embedded in a mobile terminal, the method including requesting by the first controller for a first data corresponding to a first user request from the second web server, receiving the first data from the second web server and executing the received first data, and requesting by the second controller for a second data corresponding to a second user request from the first web server, receiving the second data from the first web server and executing the received second data.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
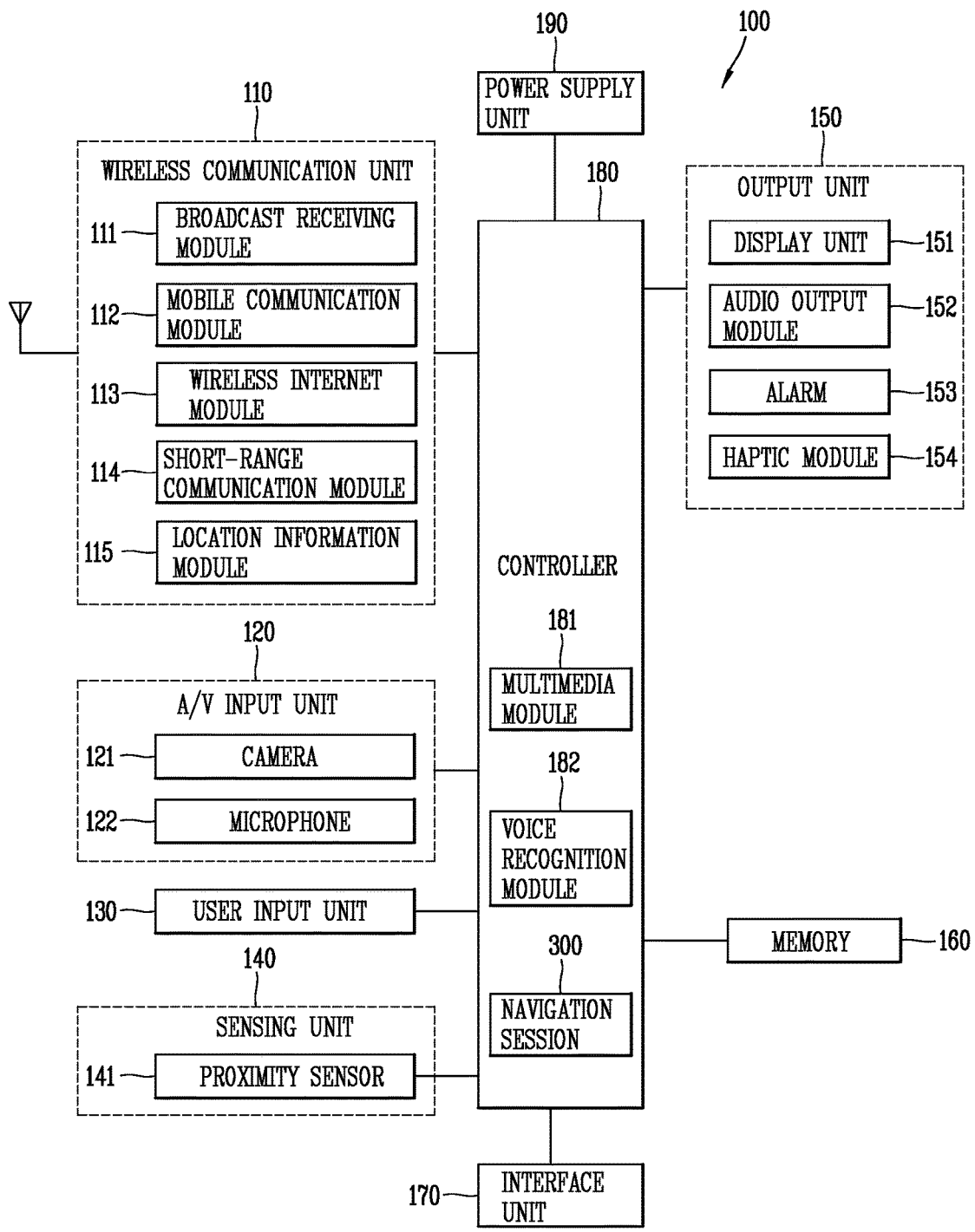
FIG. 1 is a block diagram showing a configuration of a mobile communication terminal in accordance with one exemplary embodiment.

It should be noted that technological terms used herein are merely used to describe a specific embodiment, but not to limit the present disclosure. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the spirit of the invention, and therefore, they should not be construed to limit the spirit of the invention by the accompanying drawings.

FIG. 1 is a block diagram showing a configuration of a mobile communication terminal 100 in accordance with one exemplary embodiment. The mobile communication terminal (or mobile terminal) 100 may be implemented in various forms such as mobile phones, smart phones, notebook computers, digital broadcast terminals, PDAs (Personal Digital Assistants), PMPs (Portable Multimedia Player), etc.

As shown in FIG. 1, the mobile communication terminal 100 includes a wireless communication unit 110, an AN (Audio/Video) input unit 120, a user input unit 130, a sensing unit 140, an output unit 150, a memory 160, an interface unit 170, a controller 180, and a power supply unit 190. FIG. 1 shows the mobile communication terminal 100 having various components, but it is understood that implementing all of the illustrated components is not a requirement. The mobile communication terminal 100 may be implemented by greater or fewer components.

The wireless communication unit 110 typically includes one or more components allowing radio communication between the mobile communication terminal 100 and a wireless communication system or a network in which the mobile communication terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of a digital multimedia broadcasting (DMB) system, an electronic service guide (ESG) of a digital video broadcast-handheld (DVB-H) system, and the like.

The broadcast receiving module 111 may be configured to receive signals broadcast by using various types of broadcast systems. In particular, the broadcast receiving module 111 may receive a digital broadcast by using a digital broadcast system such as a multimedia broadcasting-terrestrial (DMB-T) system, a digital multimedia broadcasting-satellite (DMB-S) system, a data broadcasting system such as media forward link only (MediaFLO®), a digital video broadcast-handheld (DVB-H) system, integrated services digital broadcast-terrestrial (ISDB-T), etc. The broadcast receiving module 111 may be configured to be suitable for additional broadcast systems that provide a broadcast signal as well as the above-mentioned digital broadcast systems. Broadcast signals and/or broadcast-associated information received via the broadcast receiving module 111 may be stored in the memory 160 (or any type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile communication terminal 100. Wireless internet can be supported using one or more of the following: a wireless local area network (WLAN), Wi-Fi, wireless broadband (WiBro), world interoperability for microwave access (WiMAX), high speed downlink packet access (HSDPA), and the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location of the mobile communication terminal (when the mobile communication terminal is located in a vehicle, the location of the vehicle can be determined). For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry based on the measured time and distances. A method of acquiring distance and time information from three satellites and performing error correction with a single satellite may be used. In particular, the GPS module may acquire an accurate time together with three-dimensional speed information as well as latitude, longitude and altitude values from the location information received from the satellites. As the location information module 115, a Wi-Fi location system and/or hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video acquired by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (e.g., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating a user's authority for using the mobile communication terminal 100 and may include a user identity module (UIM), a subscriber identity module (SIM) a universal subscriber identity module (USIM), and the like.

In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile communication terminal 100 or may be used to transfer data between the mobile communication terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile communication terminal 100. For example, when the mobile communication terminal 100 is in a phone call mode, the display unit 151 may display a User Interface (UI) or a Graphic User Interface (GUI) associated with a call or other communication (such as text messaging, multimedia file downloading, etc.). When the mobile communication terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

The mobile communication terminal 100 may include two or more display units (or other display devices) according to its implementation type. For example, the mobile communication terminal may include both an external display unit (not illustrated) and an internal display unit (not illustrated).

Meanwhile, when a sensor (referred to as a 'touch sensor', hereinafter) for detecting a touch operation of the display unit 151 is overlaid in a layered manner (referred to as a 'touch screen'), the display unit 151 may function as both an input device and an output device. The touch sensor may, for example, take the form of a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input location and a touch input area. When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display unit 151.

The proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The proximity sensor 141 may be, for example, a transmission type photo sensor, a direct reflection type photo sensor, a mirror-reflection type photo sensor, an RF oscillation type proximity sensor, a capacitance type proximity sensor, a magnetic proximity sensor, or an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

Recognition of the pointer located to be close to the touch screen without being in contact with the touch screen will be called a 'proximity touch', while recognition of actual contacting of a pointer on the touch screen will be called a 'contact touch'. In this case, when the pointer is in the state of a proximity touch, it means that the pointer is located to correspond vertically to the touch screen.

The proximity sensor 141 may detect a proximity touch and a proximity touch pattern (e.g., a proximity touch distance, a proximity touch speed, a proximity touch time, a proximity touch location, a proximity touch movement state, or the like), and output information corresponding to the detected proximity touch operation and the proximity touch pattern to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile communication terminal 100 (e.g., a call signal reception sound, a message reception sound, other communication reception sounds, etc.). The audio output module 152 may include a speaker, a buzzer, or other sound generating device.

The alarm unit 153 (or any other type of user notification devices) may provide outputs to inform about the occurrence of an event of the mobile communication terminal 100. Typical events may include call reception, message reception, key signal inputs, a touch input, etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (e.g., vibrations) to inform the user thereof. Or, when a key signal is input, a vibrating member may vibrate the mobile communication terminal 100 to feedback the key signal input. By providing such tactile outputs, the user can recognize the occurrence of various events. Outputs associated with the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as by stimulation using a pin arrangement vertically moving with respect to a contact skin, a spray force or suction force of air through a jet orifice or a suction opening, a contact on the skin, a contact of an electrode, electrostatic force, or an effect by reproducing the sense of cold and warmth using an element that can absorb or generate heat.

The haptic module 154 may be implemented to allow the user to feel a tactile effect through a muscle sensation such as fingers or arms of the user, as well as transferring the tactile effect through a direct contact. Two or more haptic modules 154 may be provided according to the configuration of a telematics terminal. For example, the haptic module 154 may be provided at a steering wheel, a gear shift lever, a car seat, and the like.

The memory 160 may store programs used for processing and controlling operations performed by the controller 180, or may temporarily store data (e.g., a phonebook, messages, still images, video, etc.) that is inputted or outputted.

The memory 160 may include at least one type of storage medium including a Flash memory, a hard disk, a multimedia card micro type memory, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile communication terminal 100 may be operated in relation to a web storage device that performs the storage function of the memory 160 over the Internet.

The interface unit 170 serves as an interface with external devices connected with the mobile terminal 100. For example, the interface unit 170 may transmit data to an external device, receive and transmit power to elements of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. The identification module may be a chip that stores various information for authenticating a user of the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile communication terminal 100 is connected with an external cradle, the interface unit 170 may serve as a conduit to allow power from the cradle to be supplied there through to the mobile communication terminal 100 or may serve as a conduit to allow various command signals inputted from the cradle to be transferred to the mobile communication terminal there through. Various command signals or power inputted from the cradle may operate as signals for recognizing when the mobile communication terminal is properly mounted on the cradle.

The controller 180 typically controls the general operations of the mobile communication terminal 100. For example, the controller 180 may perform controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images.

The power supply unit 190 receives external power or internal power and supplies appropriate power required for operating respective elements and components under the control of the controller 180.

Functions of those components applied to the mobile communication terminal 100 described herein may be implemented in a computer-readable or similar medium using, for example, software, hardware, or any combination thereof. For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180 itself. For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

A voice recognition module 182 may recognize a voice generated by the user and perform a corresponding function according to the recognized voice signal.

A navigation session 183 applied to the mobile communication terminal 100 may display travel route map data.

Figure 2:
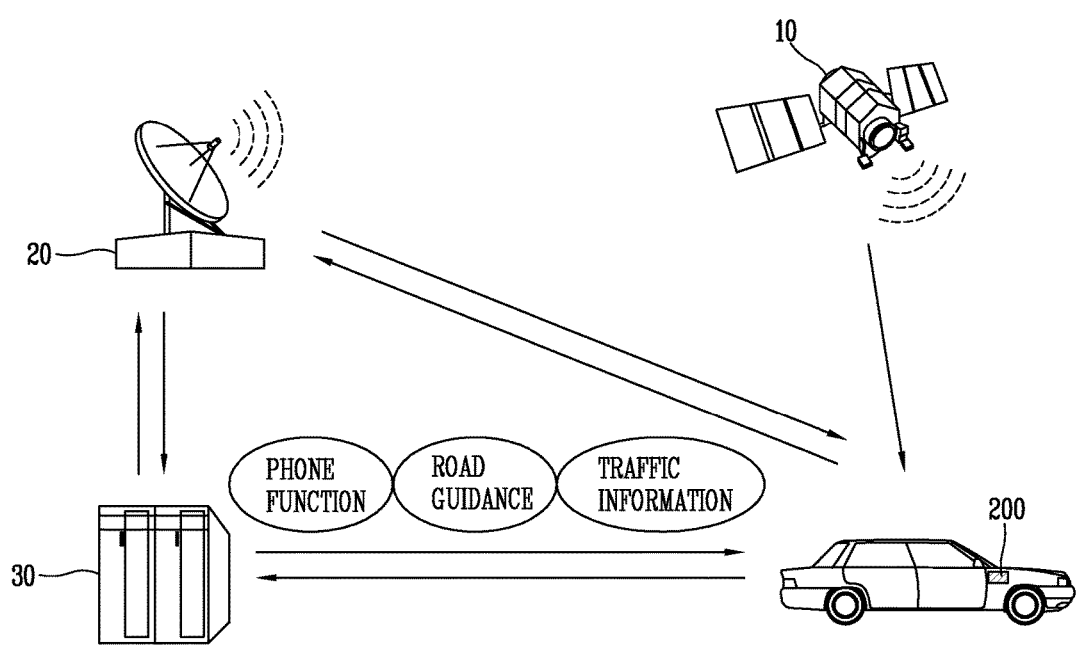
FIG. 2 is a block diagram showing a vehicle navigation system according to an exemplary embodiment.

FIG. 2 is a block diagram illustrating a vehicle navigation system in accordance with an exemplary embodiment.

As illustrated in FIG. 2, a vehicle navigation system 300 may include an information providing center 30 for providing traffic information and various data (e.g., programs, execution files, etc.), and a telematics terminal 200 that is mounted within a vehicle, receives traffic information via a remote wireless communication network 20 and/or short-range wireless communication network, and provides a road guidance service based on a GPS signal received via an artificial satellite 10 and the traffic information. Here, the communication network may further include wired/wireless communication networks such as local area network (LAN) and wide area network (WAN).

Various traffic information (for example, road traffic information, interested area information) in addition to traffic light information may be collected via the communication network, and the collected information may be processed according to a transport protocol expert group (TPEG) standard in the information providing center 30 (for example, a server), to be sent to a broadcast station. The broadcast station may then insert the traffic information including the traffic light information into a broadcast signal and broadcast it to the vehicle 200. The information providing center 30 (for example, the server) may also transmit the traffic information to the telematics terminal 200 of the vehicle through the communication network.

The server may reconfigure (reconstruct) a digital broadcast service through various routes connected to the communication network, for example, an operator input, wired/wireless Internet, transparent data channel (TDC) and multimedia object transport (MOC), and various traffic information collected from a different server or a probe car, into a traffic information format such as a format in conformity with the TPEG standard, a standard for a traffic information service. The server may then transmit the reconfigured information to the broadcast station or the telematics terminal 200.

The server may generate traffic information of a TPEG format including traffic light information, and transmit the generated traffic information to the broadcast station.

The traffic information may include the traffic light information, and additionally include information relating to various traffic conditions, which are required for operating the road, sea and air transportation, such as an accident, a road condition, traffic congestion, road construction, a road closure, a public traffic network delay, an air transportation holdup and the like.

The broadcast station may receive the processed traffic information including the traffic light information from the server and transmit it to the vehicle 200 through a digital signal in conformity with various digital broadcasting standards. Here, the broadcast standards may include various types of digital broadcast standards, such as a Europe-oriented digital audio broadcasting (DAB) standard based on Eureca-147 [ETSIEN 300 401], terrestrial or satellite digital multimedia broadcasting (DMB) standard, a terrestrial digital video broadcasting (DVB-T) standard, a digital video broadcasting-handheld (DVB-H) standard, a media forward link only (MFLO) standard, and the like.

Also, the broadcast station may transmit the traffic information including the traffic light information via a wireline/wireless network such as wireline/wireless Internet.

The telematics terminal 200 may receive the traffic light information included in the traffic information, and transfer the traffic light information to a user via graphic, text and/or audio.

Hereinafter, description will be given of the configuration of the telematics terminal mounted in the vehicle according to an exemplary embodiment, with reference to FIG. 3.

Figure 3:
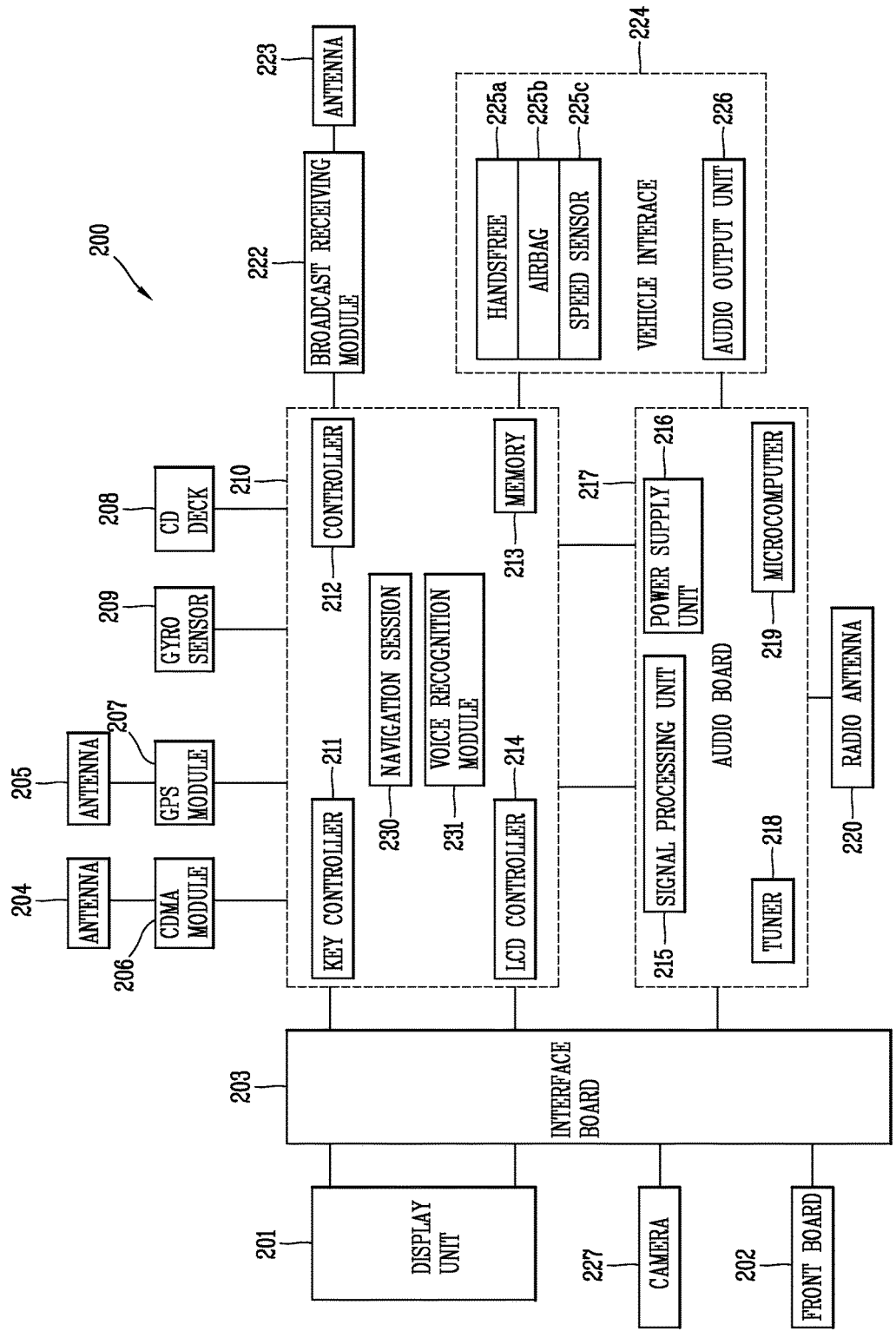
FIG. 3 is a block diagram showing a configuration of a telematics terminal in accordance with an exemplary embodiment.

FIG. 3 is a block diagram showing a configuration of a telematics terminal 200 in accordance with an exemplary embodiment.

As shown in FIG. 3, the telematics terminal 200 may include a main board 210 including a controller (for example, a central processing unit (CPU)) 240 for overall control of the telematics terminal 200, a memory 213 for storing various information, a key controller 211 for controlling various key signals, and an LCD controller 214 for controlling an LCD.

The memory 213 may store map information (map data) for displaying road guidance information on a digital map. The memory 213 may additionally store a traffic information collecting control algorithm for inputting traffic information according to the situation of a road along which the vehicle currently travels (runs), and information for controlling the algorithm.

The main board 210 may include a code division multiple access (CDMA) module 206 as a mobile terminal having a unique device number assigned and installed in the vehicle, a GPS module 207 for announcing a location of the vehicle, receiving a GPS signal for tracking a travel route from a start point to a destination, or transmitting traffic information collected by the user via a GPS signal, a CD deck 208 for reproducing a signal recorded in a compact disk (CD), a gyro sensor 209 and the like. The CDMA module 206 and the GPS module 207 may transmit and receive signals via antennas 204 and 205.

A broadcast receiving module 222 may be connected with the main board 210 and receive a broadcast signal via an antenna 223. The main board 210 may be connected via an interface board 203 with a display unit (i.e., an LCD) 201 controlled by the LCD controller 214, a front board 202 controlled by the key controller 211, and a camera 227 for capturing the interior and/or the exterior of the vehicle. The display unit 201 may display various video signals and character signals, and the front board 202 may include buttons for various key signal inputs and provide a key signal corresponding to a button selected by the user to the main board 210. In some instances, the display unit 201 may include a proximity sensor of FIG. 2 and a touch sensor (touch screen).

The front board 202 may include a menu key for directly inputting traffic information. The menu key may be controlled by the key controller 211.

An audio board 217 may be connected to the main board 210 and process various audio signals. The audio board 217 may include a microcomputer 219 for controlling the audio board 217, a tuner 218 for receiving a radio signal, a power supply unit 216 for supplying power to the microcomputer 219 and a signal processing unit 215 for processing various voice signals.

The audio board 217 may also include a radio antenna 220 for receiving a radio signal and a tape deck 221 for playing an audio tape. The audio board 217 may further include an audio output unit (for example, an amplifier) 226 for outputting a voice signal processed by the audio board 217.

The audio output unit (amplifier) 226 may be connected to a vehicle interface 224. Namely, the audio board 217 and the main board 210 may be connected to the vehicle interface 224. A hands-free module 225a for receiving a voice signal, an airbag 225b configured for the security of a passenger, a speed sensor 225c for detecting the speed of the vehicle and the like may be connected to the vehicle interface 224. The speed sensor 225c may calculate a vehicle speed and provide the calculated vehicle speed information to the CPU 240.

A navigation session 230 applied to the telematics terminal 200 may generate road guidance information based on the map data and current location information of the vehicle and provide the generated road guidance information to a user.

The display unit 201 may detect a proximity touch within a display window via the proximity sensor. For example, when a pointer (e.g., user's finger or stylus) give a proximity touch, the display unit 201 may detect the position of the proximity touch and output position information corresponding to the detected position to the controller 212.

A voice recognition device (or a voice recognition module) 231 may recognize a voice pronounced by the user and perform a corresponding function according to the recognized voice signal.

The navigation session 230 applied to the telematics terminal 200 may display a travel route on map data. When the mobile terminal 100 is located within a preset distance from a blind spot included in the travel route, the navigation session 300 may automatically form wireless networks with terminals (e.g., vehicle navigation apparatuses) mounted in a nearby vehicle or mobile communication terminal carried around by a nearby pedestrian via radio communication (for example, a short-range wireless communication network), to receive location information of the nearby vehicle from the terminal mounted in the nearby vehicle and receive location information of the nearby pedestrian from the mobile communication terminal carried around by the nearby pedestrian.

Hereinafter, description will be given of an information providing system and method according to exemplary embodiments, which is capable of sharing (providing) information (for example, application programs, contents, data, etc.) stored in each of a plurality of terminals, by allowing the plurality of terminals to exchange such application programs (or web application programs) for use through embedded web servers thereof. The plurality of terminals may be the same type of terminals or heterogeneous terminals.

Figure 4:
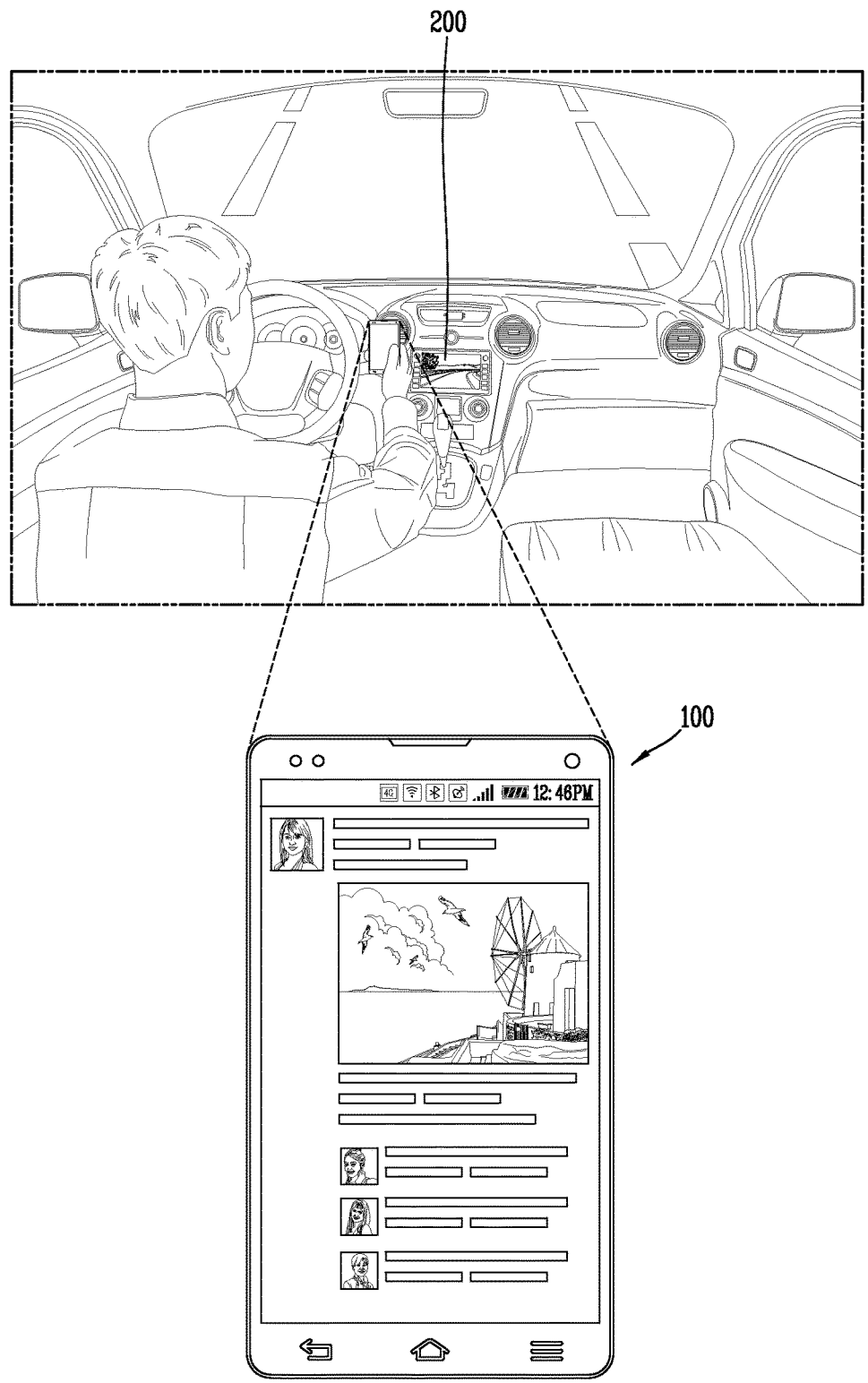
FIG. 4 is an exemplary view illustrating terminals applied to an information providing system in accordance with exemplary embodiments.

FIG. 4 is an exemplary view illustrating terminals applied to an information providing system in accordance with exemplary embodiments.

As illustrated in FIG. 4, the plurality of terminals may include a telematics terminal (or a head unit) 200 mounted in a vehicle, and a plurality of mobile communication terminals 100. The plurality of terminals may be connected together through a wireless or wired communication network. The telematics terminal 200 may be used by a driver of the vehicle, and the plurality of mobile communication terminals 100 may be used by a passenger(s) of the vehicle.

The telematics terminal 200 may be replaced with a navigation device or another mobile communication terminal 100. Also, the plurality of mobile communication terminals 100 may be replaced with plural rear seat entertainment systems (RSEs), cellular phones, smart phones, notebook computers, digital broadcasting terminals, PDAs, PMPs, tablet PCs, and the like. Hereinafter, description will be given of an example in which the plurality of terminals includes the telematics terminal 200 and at least one mobile communication terminal 100.

Figure 5:
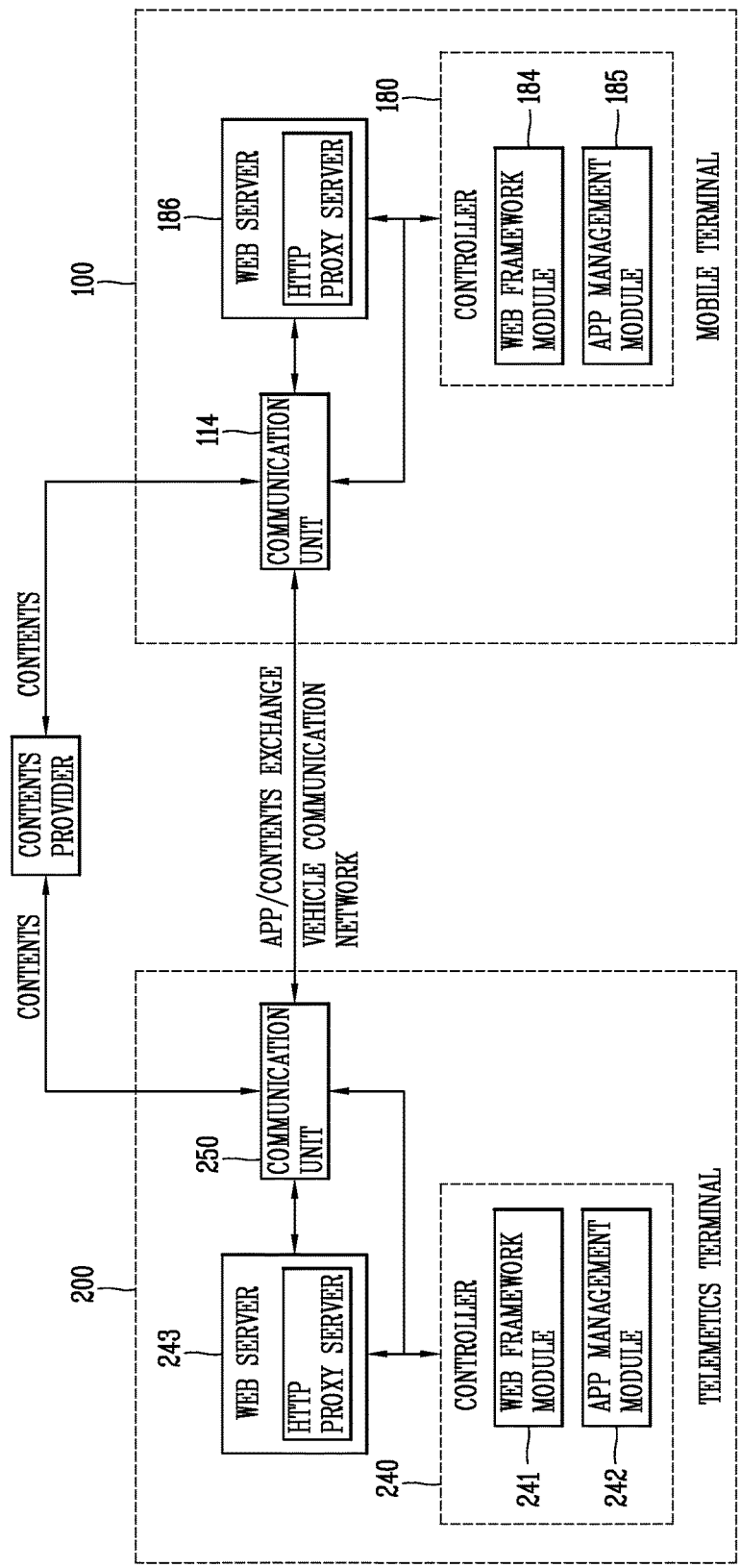
FIG. 5 is a configuration view of an information providing system in accordance with an exemplary embodiment.

FIG. 5 is a configuration view of an information providing system in accordance with an exemplary embodiment.

As illustrated in FIG. 5, an information providing system according to an exemplary embodiment disclosed herein may include a first web server 243 and a first controller 240 embedded in the telematics terminal 200 installed in a vehicle, and a second web server 186 and a second controller 180 embedded in the mobile terminal 100.

The first controller 240 requests the second web server 186 to transmit a first application program (for example, a web application program, a contents-related application program, etc.) corresponding to a first user request, and receives the first application program from the second web server 186 for execution.

The second controller 180 requests the first web server 243 to transmit a second application program (for example, a web application program, a contents-related application program, etc.) corresponding to a second user request, and receives the second application program from the first web server 243 for execution.

The first controller 240 may include a first web framework module 241 which controls the second web server 186 to provide the first application program stored in the second web server 186 to the first controller 240. The second controller 180 may include a second web framework module 184 which controls the first web server 243 to provide the second application program stored in the first web server 243 to the second controller 180.

The first and second controllers 240 and 180 share (or exchange) application programs, contents, data and the like, which are stored in each server 243 and 186 through a vehicle communication network (for example, a near field wireless communication network). For example, the first and second controllers 240 and 180 share application programs, contents, data and the like, which are stored in the corresponding web servers 243 and 186 through communication units 250 and 114 included in the telematics terminal 200 and the mobile terminal 100, respectively. The communication units 250 and 114 may include both a near field communication unit and a long distance communication unit.

The controller 180 of the mobile terminal 100 includes (inserts) metadata, which is associated with a vehicle moving-related regulation, into the first application program (for example, the web application program, the contents-related application program, etc.), which has been requested by the telematics terminal 200 (for example, the controller 240), and provides the first application program including the metadata to the telematics terminal 200. The metadata refers to information indicating whether or not the first application program corresponds to an application program which should be regulated during movement of the vehicle. The telematics terminal 200 (for example, the controller 240) stops the execution of the first application program during the movement of the vehicle when the first application program is a target (for example, a video application program) to be regulated during the movement of the vehicle, and executes the first application program while the vehicles is stopped or moved when the first application program is not the target to be regulated. For example, the first controller 240 may further include a first application program management module 242 which manages the first application program received from the second web server 186, and the second controller 180 may further include a second application program management module 185 which manages the second application program received from the first web server 243.

The second application program management module 185 includes (inserts) metadata, which indicates whether or not the first application program is a target to be regulated during movement of the vehicle, into the first application program. The second application program management module 185 then transmits the first application program including the metadata to the controller 240. The first application program management module 242 checks whether or not the first application program is the target to be regulated during the movement of the vehicle based on the metadata included in the first application program. When the first application program is the target to be regulated during the movement of the vehicle and the vehicle is under movement, the first application program management module 242 stops the execution of the first application program.

The first controller 240 provides the second controller 180, through the vehicle communication network, with resources which includes various types of information related to the vehicle, such as a location, an inner temperature, a vehicle diagnosis, a movement (travel state), speed, and the like. The second controller 180 provides resources including messages, schedules and the like to the first controller 240 through the vehicle communication network.

The first controller 240 requests web service information supportable in the vehicle from the second controller 180, and receives the web service information, which includes an application program list, from the second controller 180. The first controller 240 then displays the application program list included in the received web service information on a display unit 201 of the telematics terminal 200. The first controller 240 accesses a contents provider or the second web server 186 based on location information (for example, uniform resource locator (URL) related to an application program, selected by the user from the displayed application program list, and then receives the user-selected application program from the contents provider or the second web server 186 for execution.

The first web server 243 of the telematics terminal 200 and the second web server 186 of the mobile terminal 100 may further include a hypertext transfer protocol (HTTP) proxy server, respectively.

The HTTP proxy sever of the telematics terminal 200 executes an Internet connection (or Internet connectivity) with an external web server (for example, a contents provider) upon the failure of the Internet connection of the mobile terminal 100, so as to provide contents provided by the external web server to the mobile terminal 100.

The HTTP proxy server of the mobile terminal 100 executes an Internet connection an external web server (for example, a contents provider) upon the failure of the Internet connection of the telematics terminal 200, so as to provide contents provided by the external web server to the telematics terminal 200.

Figure 6:
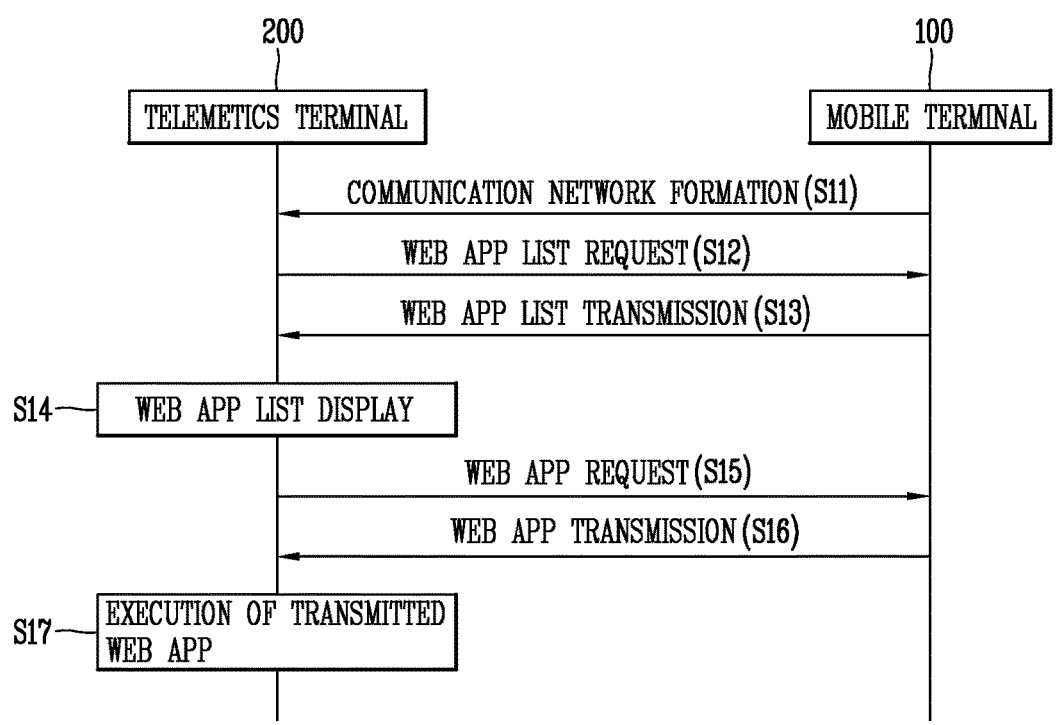
FIG. 6 is a flowchart illustrating an information providing method in accordance with an exemplary embodiment.

FIG. 6 is a flowchart illustrating an information providing method in accordance with an exemplary embodiment, which illustrates a method of transmitting an application program of the mobile terminal 100 to the telematics terminal 200.

First, the first controller 240 forms a wireless communication network with the mobile terminal 100 (S11). For example, the first controller 240 controls the communication unit 250 to form a near field communication network with the communication unit 114 of the mobile terminal 100, thereby forming the near field wireless communication network (vehicle communication network) between the telematics terminal 200 and the mobile terminal 100.

The first controller 240 requests for an application program (web app) list (for example, a page including application program icons) from the second controller 180, in response to a user request (S12). For example, the first controller 240 requests for the application program list from the second controller 180 through the near field wireless communication network (vehicle communication network) in case where a voice for requesting for the application program list is recognized, a touch input for requesting for the application program list is received, a gesture for requesting for the application program list is input, or a button for requesting for the application program list is selected.

The second controller 180 transmits the application program list, which is stored in the second web server 186 or the memory 160, to the first controller 240 through the near field wireless communication network (vehicle communication network), in response to the request for the application program list (S13).

The first controller 240 displays the application program list on the display unit 201 (S14).

Figure 7:
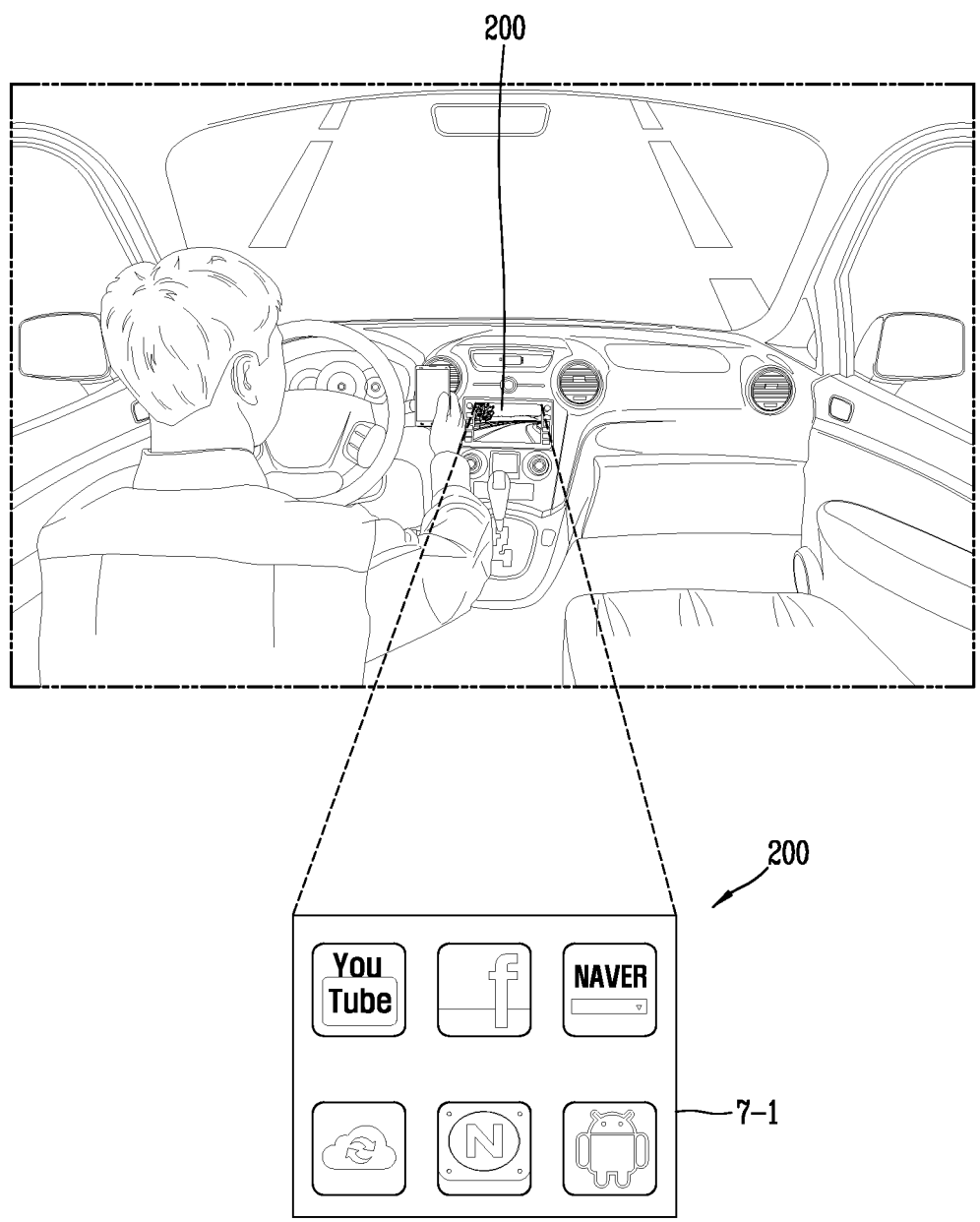
FIG. 7 is an exemplary view illustrating an application program (web App) list in accordance with an exemplary embodiment.

FIG. 7 is an exemplary view illustrating an application program (web App) list in accordance with an exemplary embodiment.

As illustrated in FIG. 7, the first controller 240 receives an application program list 7-1 from the mobile terminal 100, and displays the received application program list 7-1 on the display unit 201. The first controller 240 may detect only application program icons, which are not present in an application program list stored in a memory 213 thereof, from application program icons included in the received application program list, and display the detected application program icons 7-1 on the display unit 201.

The first controller 240 requests the second controller 180 to transmit an application program corresponding to an application program icon, which has been selected by the user from the application program icons displayed on the display unit 201 (S15).

The second controller 180 transmits the requested application program, which is stored in the second web server 186, to the first controller 240, in response to the application program request (S16).

On the other hand, the first controller 240 may also request the second web server 186 to transmit the application program corresponding to the application program icon, which has been selected by the user from the application program icons displayed on the display unit 201, and the second web server 186 may transmit the application program stored therein to the first controller 240, in response to the application program request.

The first controller 240 executes the application program received from the second web server 186 (S17).

Hereinafter, description will be given of a method of transmitting an application program of the telematics terminal 200 to the mobile terminal 100.

First, the second controller 180 forms a wireless communication network with the telematics terminal 200. For example, the second controller 180 controls the communication unit 114 to form a near field wireless communication network with the communication unit 250 of the telematics terminal 200, thereby forming the near field wireless communication network (vehicle communication network) between the telematics terminal 200 and the mobile terminal 100.

The second controller 180 requests for an application program (web app) list (for example, a page including application program icons) from the first controller 240, in response to a user request. For example, the second controller 180 requests for the application program list from the first controller 240 through the near field wireless communication network (vehicle communication network) in case where a voice for requesting for the application program list is recognized, a touch input for requesting for the application program list is received, a gesture for requesting for the application program list is input, or a button for requesting for the application program list is selected.

The first controller 240 transmits the application program list, which is stored in the first web server 243 or the memory 213 thereof, to the second controller 180 through the near field wireless communication network (vehicle communication network), in response to the application program list request.

The second controller 180 displays the application program list on the display unit 151. The second controller 180 may also detect only application program icons, which are not present in an application program list stored in the memory 160, from application program icons included in the received application program list, and display the detected application program icons on the display unit 151.

The second controller 180 requests the second controller 240 to transmit an application program corresponding to an application program icon, which has been selected by the user from the application program icons displayed on the display unit 151.

The first controller 240 transmits the application program stored in the first web server 243 thereof to the second controller 180, in response to the application program request.

On the other hand, the second controller 180 may also request the first web server 243 to transmit an application program corresponding to the application program icon, which has been selected by the user from the application program icons displayed on the display unit 151, and the first web server 243 may transmit the application program stored therein to the second controller 180, in response to the application program request.

The second controller 180 executes the application program received from the first web server 243.

Therefore, according to an information providing system and method according to an exemplary embodiment disclosed herein, without receiving and/or updating an application program from a contents provider as an external web server through a long distance communication network, the corresponding application program or updated application program may be received from an adjacent terminal through a near field communication network. This may allow a user to be provided with a desired application program in an easy, fast manner and enable a reduction of data reception costs.

Figure 8:
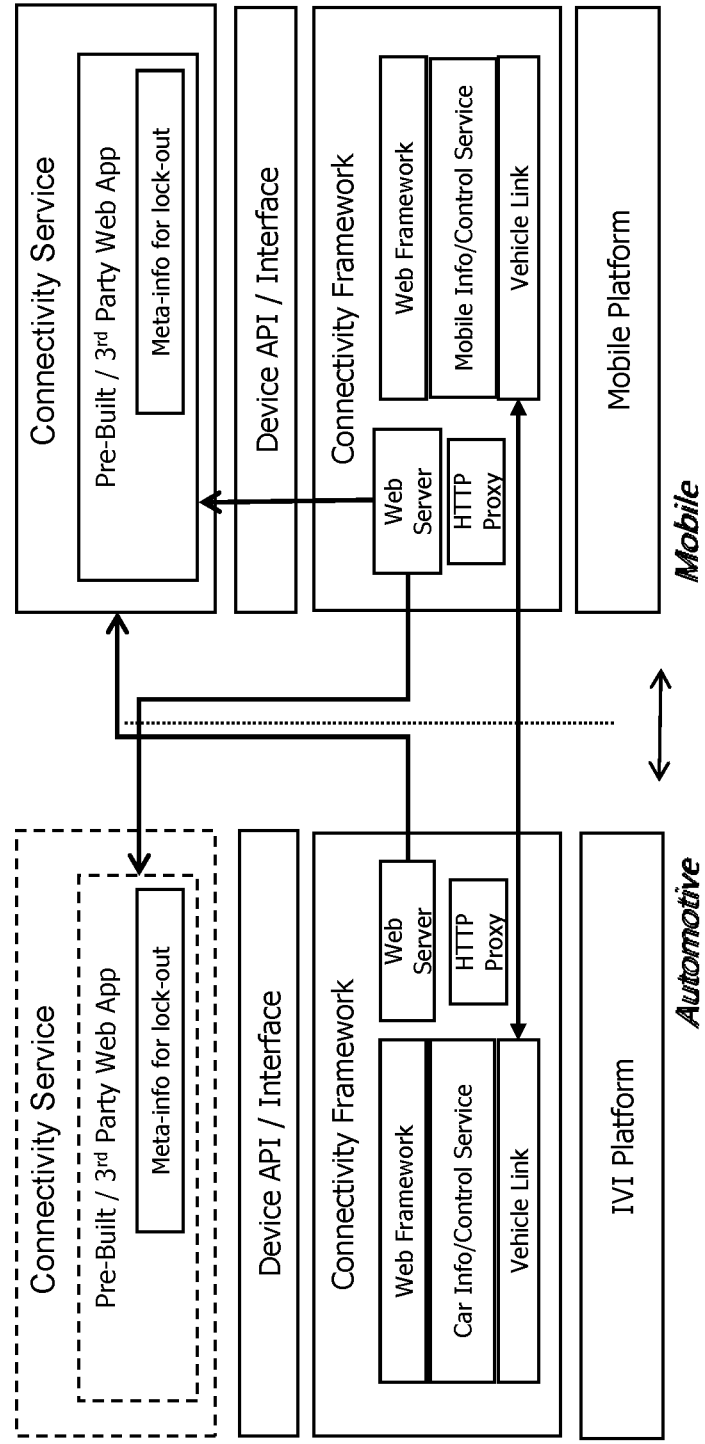
FIG. 8 illustrates an information providing method between vehicle and mobile in accordance with another exemplary embodiment.

FIG. 8 illustrates an information providing method between vehicle and mobile in accordance with another exemplary embodiment.

A web server embedded in the vehicle and a web server embedded in the mobile terminal can exchange the provided functions/application programs respectively.

1-1) The application programs can be transferred between the vehicle and the mobile terminal through the web servers.

1-2) The application programs can be used between the vehicle and the mobile terminal through interworking from one side to another side. For example, the vehicle is diagnosed in the environment of mobile terminal, or the application program of vehicle can be taken by the mobile terminal through connection with the web server of the vehicle even when the vehicle does not control the application cooperatively.

1-3) The HTML and JavaScript code of the application in the mobile terminal is transferred to the vehicle through HTTP protocol between the web servers for applying to travel restriction. The travel restriction related meta data is contained as content in the web application in the mobile terminal. The display is controlled according to travel state, when the application of mobile terminal is run in the vehicle.

1-4) The mobile terminal and the vehicle use the same platform (All web applications in the vehicle can be shared by all of the mobile terminals, irrespective of the OS).

1-5) The content/service provided in the mobile terminal can be transferred through web server. In the case of updating in the mobile terminal, no additional updating is needed in the environment of vehicle.

1-6) The vehicle is controlled by mobile terminal through web servers via content/server provided in the vehicle.

1-7) When the web server has no direct Wi-Fi connection: when the web application in the vehicle cannot make cloud request (has no network connection), the Cloud Request can be made by HTTP Forward Proxy server in the mobile terminal.

Figure 9:
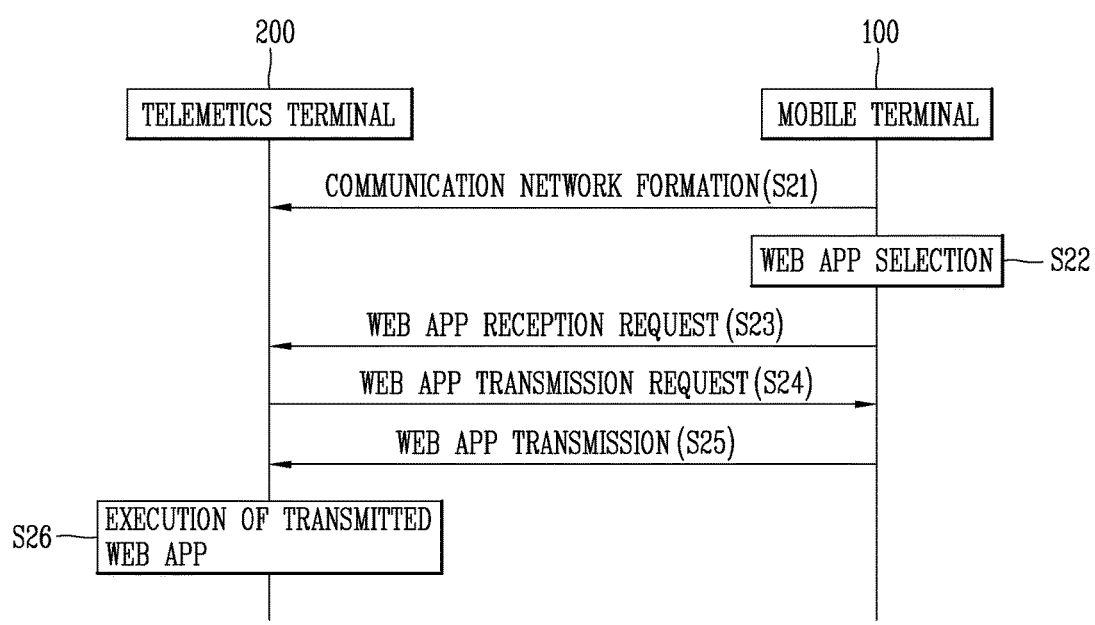
FIG. 9 is a flowchart illustrating an information providing method in accordance with another exemplary embodiment.

FIG. 9 is a flowchart illustrating an information providing method in accordance with another exemplary embodiment, which illustrates a method of transmitting an application program of the mobile terminal 100 to the telematics terminal 200. Here, the method of transmitting the application program of the mobile terminal 100 to the telematics terminal 200 is the same as the method of transmitting the application program of the telematics terminal 200 to the mobile terminal 100, so description thereof will be omitted.

First, the second controller 180 forms a wireless communication network with the telematics terminal 200 (S21). For example, the second controller 180 controls the communication unit 114 to form a near field communication network with the communication unit 250 of the telematics terminal 200, thereby forming the near field wireless communication network (vehicle communication network) between the telematics terminal 200 and the mobile terminal 100.

The second controller 180 displays the application program list (for example, a page including application program icons) on the display unit 151, in response to a user request. For example, the second controller 180 displays the application program list on the display unit 151 in case where a voice for requesting for the application program list is recognized, a touch input for requesting for the application program list is received, a gesture for requesting for the application program list is input, or a button for requesting for the application program list is selected.

When the user selects a specific application program icon from the displayed application program icons (S22), the second controller 180 generates reception request information to request for a reception of an application program corresponding to the selected specific application program icon, and transmits the generated reception request information to the first controller 240 (S23).

The first controller 240 displays the reception request information on the display unit 201, and requests the second controller 180 to transmit an application program corresponding to the specific application program icon, in response to a user request (S24).

The second controller 180 transmits the application program, which is stored in the second web server 186, to the first controller 240 in response to the application program request (S25). The first controller 240 executes the application program received from the second web server 186 (S26).

Therefore, according to an information providing system and method according to another exemplary embodiment disclosed herein, without receiving and/or updating an application program from a contents provider as an external web server through a long distance communication network, the corresponding application program or updated application program may be received from an adjacent terminal through a near field communication network. This may allow a user to be provided with a desired application program in an easy, fast manner and enable a reduction of data reception.

Figure 10:
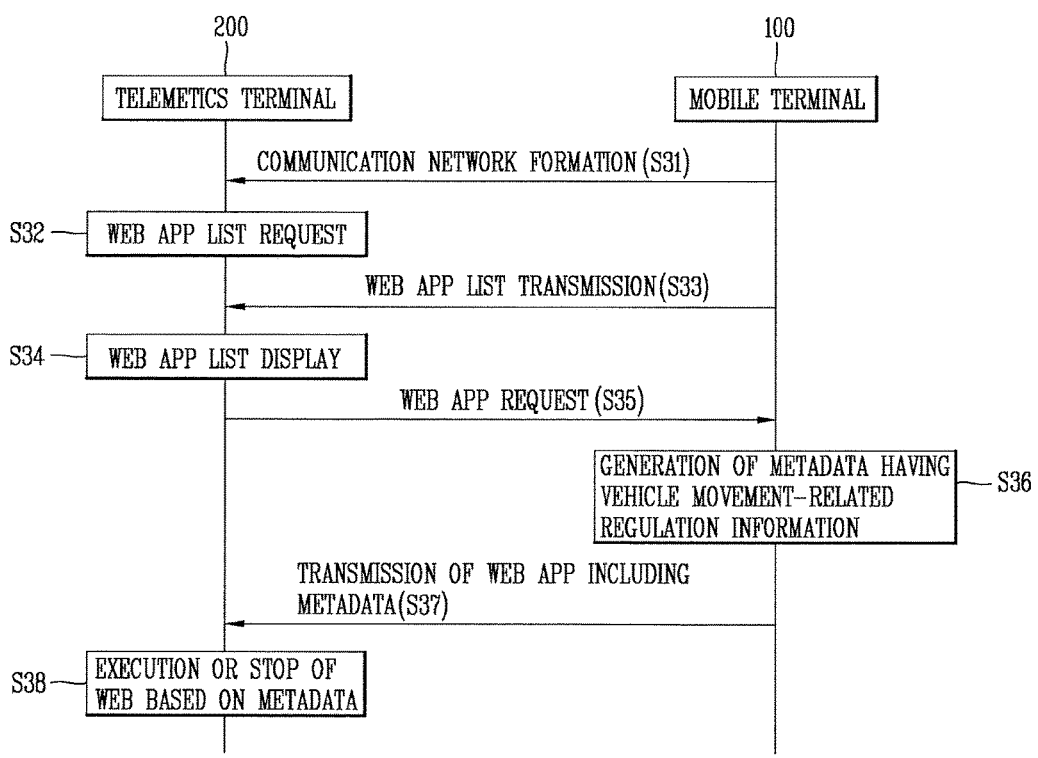
FIG. 10 is a flowchart illustrating an information providing method in accordance with another exemplary embodiment.

FIG. 10 is a flowchart illustrating an information providing method in accordance with another exemplary embodiment, which illustrates a method of transmitting an application program of the mobile terminal 100 to the telematics terminal 200.

First, the first controller 240 forms a wireless communication network with the telematics terminal 200 (S31). For example, the first controller 240 controls the communication unit 250 to form a near field communication network with the communication unit 114 of the mobile terminal 100, thereby forming the near field wireless communication network (vehicle communication network) between the telematics terminal 200 and the mobile terminal 100.

The first controller 240 requests for an application program (web app) list (for example, a page including application program icons) from the second controller 180, in response to a user request (S32). For example, the first controller 240 requests for the application program list from the second controller 180 through the near field wireless communication network (vehicle communication network) in case where a voice for requesting for the application list is recognized, a touch input for requesting for the application program list is received, a gesture for requesting for the application program list is input, or a button for requesting for the application program list is selected.

The second controller 180 transmits an application program list stored in the second web server 186 or the memory 160 to the first controller 240 through the near field wireless communication network (vehicle communication network), in response to the application program list request (S33).

The first controller 240 displays the application program list on the display unit 201 (S34). For example, the first controller 240 receives the application program list from the mobile terminal 100, and displays the received application program list on the display unit 201. The first controller 240 may also detect only application program icons, which are not present in an application program list stored in the memory 213, from application program icons included in the received application program list, and display the detected application program icons on the display unit 201.

The first controller 240 requests the second controller 180 to transmit an application program corresponding to an application program icon selected by the user from the application program icons displayed on the display unit 201 (S35).

When the application program is requested by the telematics terminal 200 (for example, 240), the second controller 180 generates metadata indicating whether or not the requested application program is a target to be regulated during movement of a vehicle (S36). The second controller 180 then includes (inserts) the generated metadata into the requested application program, and provides the application program including the metadata to the first controller 240 of the telematics terminal 200 (S37). The metadata refers to information indicating whether or not the application program corresponds to an application program which should be regulated during movement of the vehicle.

The first controller 240 may check whether or not the application program corresponds to a target to be regulated during the movement of the vehicle based on the metadata. The first controller 240 stops the execution of the application program during the movement of the vehicle when the application program is the target (for example, a video application program) to be regulated during the movement, and executes the application program while the vehicle is stopped or moved when the application program is not the target to be regulated (S38).

Therefore, according to an information providing system and method according to another exemplary embodiment disclosed herein, when transmitting a specific application program to the telematics terminal 200, metadata which indicates whether or not the specific application program corresponds to a target to be regulated may be transmitted to the telematics terminal 200 along with the specific application program. This may allow the telematics terminal 200 to automatically execute or stop the specific application program according to a vehicle movement-related regulation.

Figure 11:
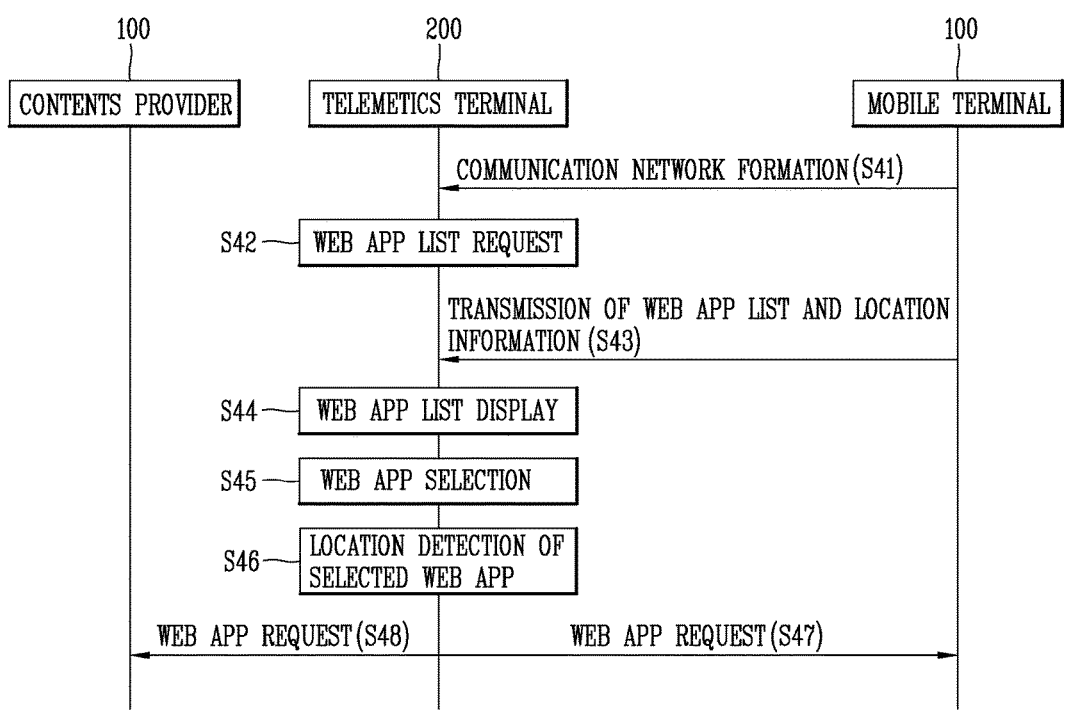
FIG. 11 is a flowchart illustrating an information providing method in accordance with another exemplary embodiment.

FIG. 11 is a flowchart illustrating an information providing method in accordance with another exemplary embodiment.

First, the first controller 240 forms a wireless communication network with the mobile terminal 100 (S41). For example, the first controller 240 controls the communication unit 250 to form a near field communication network with the communication unit 114 of the mobile terminal 100, thereby forming the near field wireless communication network (vehicle communication network) between the telematics terminal 200 and the mobile terminal 100.

The first controller 240 requests for an application program (web app) list (for example, a page including application program icons) from the second controller 180, in response to a user request (S42). For example, the first controller 240 requests for the application program list from the second controller 180 through the near field wireless communication network (vehicle communication network) in case where a voice for requesting for the application list is recognized, a touch input for requesting for the application program list is received, a gesture for requesting for the application program list is input, or a button for requesting for the application program list is selected.

In response to the application program list request, the second controller 180 transmits to the first controller 240 an application program list stored in the second web server 186 or the memory 160 and stored positions of application programs included in the application program list through the near field wireless communication network (vehicle communication network) (S43). For example, the second controller 180 transmits the stored positions, which indicate whether the application programs, which are included in the application program list stored in the second web server 186 or the memory 160, are stored in the second web server 186 or the memory 160 or in a contents provider (for example, a cloud web server), to the first controller 240 along with the application program list.

The first controller 240 displays the application program list on the display unit 201 (S44). For example, the first controller 240 receives the application program list from the mobile terminal 100 and displays the received application program list on the display unit 201.

When the user selects a specific application program icon from the application program icons (i.e., the application program list) displayed on the display unit 201 (S45), the first controller 240 detects a stored position of an application program corresponding to the selected application program icon (S46).

When the stored position of the application program corresponding to the selected specific application program icon is the second web server 186, the first controller 240 requests the second web server 186 to transmit the application program selected by the user, receives the user-selected application program from the second web server 186, and executes the received application program (S47).

When the stored position of the application program corresponding to the selected specific application program icon is the contents provider, the first controller 240 requests the contents provider to transmit the application selected by the user, receives the user-selected application program from the contents provider, and executes the received application program (S48).

Therefore, according to an information providing system and method according to another exemplary embodiment disclosed herein, a user-desired application program list and a stored position of the application program may be received from an adjacent terminal through a near field communication network and then displayed. This may allow the user to be provided with the desired application program from the adjacent terminal or a contents provider based on the stored position of the application program in an easy, fast manner.

As described above, according to an information providing system and method according to exemplary embodiments disclosed herein, without receiving and/or updating an application program from a contents provider as an external web server through a long distance communication network, the corresponding application program or updated application program may be received from an adjacent terminal through a near field communication network. This may allow a user to be provided with a desired application program in an easy, fast manner and enable a reduction of data reception costs.

According to an information providing system and method according to exemplary embodiments disclosed herein, when transmitting a specific application program to a telematics terminal, metadata which indicates whether or not the specific application program corresponds to a target to be regulated may be transmitted to the telematics terminal along with the specific application program. This may allow the telematics terminal to automatically execute or stop the specific application program according to a vehicle movement-related regulation.

According to an information providing system and method according to exemplary embodiments disclosed herein, a user-desired application program list and a stored position of an application program may be received from an adjacent terminal through a near field communication network and then displayed. This may allow the user to be provided with the desired application program from the adjacent terminal or a contents provider based on the stored position of the application program in an easy, fast manner.

As the present features may be embodied in several forms without departing from the characteristics thereof, it should also be understood by those skilled in the art that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An information providing system for a vehicle comprising:
a telematics terminal, installed at the vehicle, including a first web server and a first controller; and
a mobile terminal, located in the vehicle, including a second web server and a second controller,
wherein the first controller requests the second web server to transmit a first application program corresponding to a first user request, receives the first application program from the second web server, and executes the received first application program,
wherein the second controller requests the first web server to transmit a second application program corresponding to a second user request, receives the second application program from the first web server, and executes the received second application program, each of the first and second application programs includes at least one of an application program and contents,
wherein the second controller includes a second application program management module configured to insert metadata into the first application program and transmit the first application program including the metadata through a vehicle communication network to the first controller, the metadata indicating whether the first application program is a target to be regulated during movement of the vehicle,
wherein the first controller includes a first application program management module configured to receive the first application program including the metadata through the vehicle communication network, check whether or not the received first application program is the target to be regulated during the movement of the vehicle based on the metadata included in the first application program, stop execution of the first application program when the first application program is the target to be regulated during movement of the vehicle, and execute the first application program when the first application program is not the target to be regulated,
wherein the telematics terminal further includes a display unit for displaying an application list including application icons and position information related to respective applications corresponding to the application icons received from the second controller when the first controller requests the second controller to transmit the application list executable in the vehicle, and
wherein the first controller receives a specific application corresponding to one of a specific application icon from the second web server related to the specific application and a contents provider based on stored position information related to the specific application, when the specific application icon is selected from the displayed application list.

2. The information providing system of claim 1, wherein the first and second controllers share the first and second application programs through the vehicle communication network.

3. The information providing system of claim 1, wherein the first controller includes a first web framework module configured to control the second web server to provide the first application program stored in the second web server with the first controller, and
wherein the second controller includes a second web framework module configured to control the first web server to provide the second application program stored in the first web server with the second controller.

4. The information providing system of claim 1, wherein the first and second controllers share resources with each other through the vehicle communication network.

5. The information providing system of claim 1, wherein the first controller requests the second controller to transmit the application list with application icons, receives the application list from the second controller, detects only application icons, which are not present in an application list stored in the telematics terminal, from the application icons included in the received application list, and displays the detected application icons on a display unit of the telemetric terminal.

6. The information providing system of claim 1, wherein the second web server includes an HTTP proxy server for requesting an internet connection by the first controller, wherein the HTTP proxy server accesses an external web server in response to the internet connection request, so as to receive contents from the external web server and provide the received contents with the first controller.

7. The information providing system of claim 6, wherein the first controller accesses the external web server, so as to receive contents from the external web server and displays the received contents on a display unit of the telematics terminal.

8. An information providing method in a system for a vehicle, comprising a first web server and a first controller embedded in a telematics terminal mounted in the vehicle, and a second web server and a second controller embedded in a mobile terminal located in the vehicle, the method comprising:
requesting, by the first controller, for a first application program corresponding to a first user request from the second web server;

receiving the first application program from the second web server;

executing the received first application program;

requesting, by the second controller, for a second application program corresponding to a second user request from the first web server;

receiving the second application program from the first web server;

executing the received second application program;

inserting metadata into the first application program by the second controller, wherein the metadata indicates whether the first application program is a target to be regulated during movement of the vehicle;

transmitting the first application program including the metadata through a vehicle communication network to the first controller by the second controller;

receiving, by the first controller, the first application program including the metadata through the vehicle communication network;

checking, by the first controller, whether or not the received first application program is the target to be regulated during the movement of the vehicle based on the metadata included in the first application program;

stopping, by the first controller, the execution of the first application program when the first application program is the target to be regulated during movement of the vehicle and executing the first application program when the first application program is not the target to be regulated;

requesting, by the first controller, for an applicable program list executable in the vehicle from the second controller, receiving from the second controller both an application list including application icons and stored position information related to respective applications corresponding to the application icons, and displaying the received application list on a display unit of the telematics terminal; and receiving, by the first controller, a specific application corresponding to a specific application icon from the second web server and a contents provider based on the stored position information related to the specific application, when the specific application icon is selected from the displayed application list.

9. The method of claim 8, further comprising:

sharing the first and second application program by the first and second controllers through the vehicle communication network.

10. The method of claim 8, further comprising:

sharing resources by the first and second controllers through the vehicle communication network.

11. The method of claim 8, further comprising:

requesting, by the first controller, for the application list including application icons from the second controller, receiving the application list from the second controller, detecting only application icons, which are not present in the application list stored in the telematics terminal, from the application icons included in the received application list, and displaying the detected application icons on the display unit of the telemetric terminal.

12. The method of claim 8, further comprising:

requesting by the first controller for an internet connection from a hypertext transfer protocol (HTTP) proxy server of the second web server, wherein the HTTP proxy server accesses an external web server in response to the internet connection request, so as to receive contents from the external web server and provide the received contents to the first controller.

* * * * *